Jan. 26, 1932.  W. W. HALSEY  1,842,781
BATTERY CHARGING APPARATUS
Filed Dec. 20, 1927
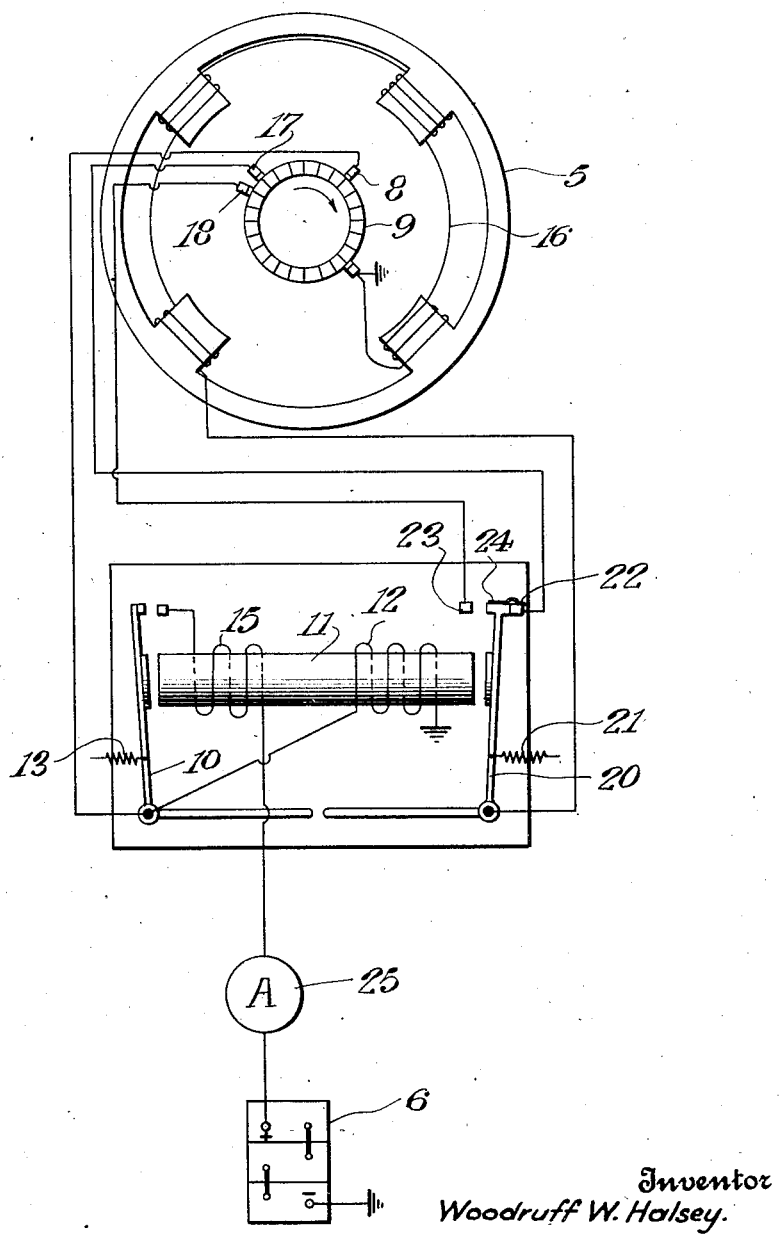
Inventor
Woodruff W. Halsey.
By his Attorney
Maurice B. Landis Patented Jan. 26, 1932

1,842,781

UNITED STATES PATENT OFFICE

WOODRUFF W. HALSEY, OF ELIZABETH, NEW JERSEY

BATTERY CHARGING APPARATUS

Application filed December 20, 1927. Serial No. 241,307.

The present invention relates to battery charging apparatus and has for an object to provide a charging apparatus having improved means for automatically controlling the rate of charging of a battery.

The invention has been developed in connection with the design of a battery charging plant for an automobile and for convenience such a plant will be described to illustrate the principles involved.

The nature and objects of the invention will be better understood from a description of a selected embodiment for the purpose of which description reference should be had to the single sheet of accompanying drawing forming a part hereof and in which—

The figure is an electrical diagram of a selected arrangement of a battery charging plant.

A generator 5 is shown connected for charging a storage battery 6. The electrical circuits are so arranged that when the battery requires charging a relatively strong current will be delivered to the battery, whereas, when the battery is approximately fully charged a small and relatively negligible charging current will be delivered.

The generator may be actuated in any suitable way. The charging current is taken from the brush 8 adjustably engaging the armature 9 and passes through a cut-out switch 10 arranged to close the charging circuit to the battery, when the voltage at the brush 8 exceeds a predetermined minimum, as, for example, 6½ volts. This is accomplished by the electro-magnet 11, the coil 12 of which is connected between the said brush terminal and the ground. When the generator develops the predetermined voltage, the current through the coil 12 will be sufficient to close the switch 10 to start charging the battery, and when in the course of operation, the generator slows down to such an extent that the voltage at the brush 8 falls below a predetermined limit, the switch 10 will be opened by the spring 13. The coil 12 is so designed as to close the switch 10 when the predetermined voltage is reached as previously indicated, but when the switch is once closed, a second coil 15 is energized by the charging current whereby the switch 10 will be held closed even though the voltage at the brush 8 falls somewhat below the above noted switch closing voltage. However, the direction of winding of the coil 15 is such that in the event the current flows in the opposite direction, that is to say, in the event current flows by discharging of the battery through the energizing coil 15, said coil will tend to neutralize the effect of the coil 12, thus causing an opening of the switch 10 by the spring 13.

It is desirable when the storage battery is relatively exhausted and requires recharging to charge at a relatively high rate and when the battery is fully charged to either discontinue charging or to charge at a relatively low rate. In the arrangement shown, provision is made for varying the rate of charging by varying the strength of the field circuit. As illustrated, the field circuit 16 is arranged to be closed alternatively through one or the other of the adjustable brushes 17, 18 by means of an automatic switch 20. The brush 18 is adjusted to provide for charging at a low rate, preferably at a minimum rate such that a long continued charging even when substantially fully charged will not be detrimental to the battery. The brush 17, on the other hand, is so adjusted as to provide for charging the battery at a maximum rate suitable for the particular battery at all expected speeds of the generator. The switch 20 which controls the alternative circuits through the brushes 17 and 18 may be connected to be operated by the electro-magnet 11 which controls the switch 10. As shown, a spring 21 is arranged to normally hold the switch 20 in engagement with the terminal 22 to close the circuit through the brush 17 providing for charging at the higher rate. When the battery is fully charged, so that the voltage thereof rises to a predetermined point, the current through the coil 12 will increase sufficiently to draw the switch 20 from the terminal 22 to the terminal 23 thus opening the circuit through the brush 17 and closing the circuit through the brush 18 to provide for charging at the lower rate. The switch 20 is preferably provided with a spring contact 24, whereby the circuit through the terminal 22 will not be broken until the switch has moved through a sufficient predetermined angle. The reduction of the charging rate will reduce the voltage and current of the coil 12 but not sufficiently to cause switch 10 to be opened if the parts are properly adjusted. The coils of the electro-magnet 11 may be combined and arranged to satisfy the requirements of the particular installation.

An ammeter 25 may be connected in the charging circuit as indicated.

The foregoing description of a particular embodiment is illustrative merely and is not intended as defining the limits of the invention.

I claim—

1. A battery charging apparatus having, in combination, a generator, a storage battery, connections for delivering current from said generator to said storage battery, said generator having two current regulating brushes and means for automatically connecting one or the other of said brushes in the field circuit of the generator, the connections being such that when one brush is connected in the field circuit, a relatively large current is delivered to the storage battery at a given generator speed and when the other brush is connected in the field circuit a relatively small current is delivered to the storage battery at said generator speed, substantially as described.

2. A battery charging apparatus, as defined in claim 1, in which the means for automatically connecting one or the other of said brushes in the field circuit of the generator comprises a magnetic switch receiving current from the generator, and operable at a given generator speed to connect one brush in the circuit when the battery is fully charged and the other brush when the battery is less fully charged substantially as described.

3. A battery charging apparatus having, in combination, a generator, a storage battery, connections for delivering current from said generator to said storage battery, said generator having two brushes and means responsive to the voltage of the storage battery for automatically connecting one or the other of said brushes in series with the generator field circuit to cause a more or less rapid charging of a storage battery, substantially as described.

4. A battery charging apparatus having, in combination, a generator, a storage battery, connections for delivering current to said storage battery at two different rates and means responsive to the voltage of the storage battery for varying the points at which the field circuit of said generator derives current from the commutator thereof to determine the rate of charge, substantially as described.

5. A battery charging apparatus having, in combination, a storage battery, a generator arranged to deliver current to said storage battery, said generator having two adjustable brushes and an automatic switch responsive to the voltage of the storage battery for connecting one or the other of said brushes alternatively in series with the generator field circuit, substantially as described.

In testimony whereof, I have signed my name to this specification this 8th day of December, 1927.

WOODRUFF W. HALSEY.